Feb. 25, 1964 — E. J. SEILER — 3,122,346
INSULATED PIPE HANGER ASSEMBLY
Filed Dec. 28, 1962

INVENTOR.
ELMER J. SEILER
BY
his ATTORNEY 3,122,346
INSULATED PIPE HANGER ASSEMBLY
Elmer J. Seiler, 1500 Hamilton Road, Pittsburgh, Pa.
Filed Dec. 28, 1962, Ser. No. 247,959
4 Claims. (Cl. 248—62)

This invention relates to a hanger assembly for supporting insulated pipes through which hot or cold fluids are conducted, and, more particularly, relates to an insert which pierces the insulation and provides a firm contacting surface for direct support by the hanger.

An outstanding disadvantage of conventional hanger assemblies for insulated pipes is that in view of the porous and fragile nature of the hollow cylindrical insulation surrounding the pipes, it is common practice to cut-out a portion of the insulation that would normally contact the hanger and replace it by an insert of dense, hard, material which will make direct contact with the pipe. Since such insert does not usually closely fit the cut-out portion, the surrounding air will infiltrate through the contacting surface between the insulation and insert, causing condensation on the internal water pipe and other disadvantages.

An object of the present invention is to overcome the above named disadvantages by eliminating the necessity for cutting out a portion of the insulation, and instead providing an insert which may pierce the outer portion of the insulation and remain firmly embedded therein so as to provide a hard, arcuate surface corresponding to the arcuate surface of the insulation, which hard, arcuate surface may be directly supported by the hanger without injury to the insulation.

A more specific object of the invention is to provide an insert which may be pushed into the outer surface of a hollow cylindrical bat of insulation to provide a bearing surface for direct support by a hanger.

Other objects and advantages will become more apparent from a study of the following description taken with the accompanying drawing wherein.

Figure 1:
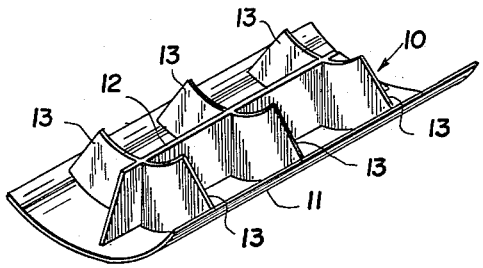
FIG. 1 is a top, perspective view of an insert embodying the present invention.
Figure 3:
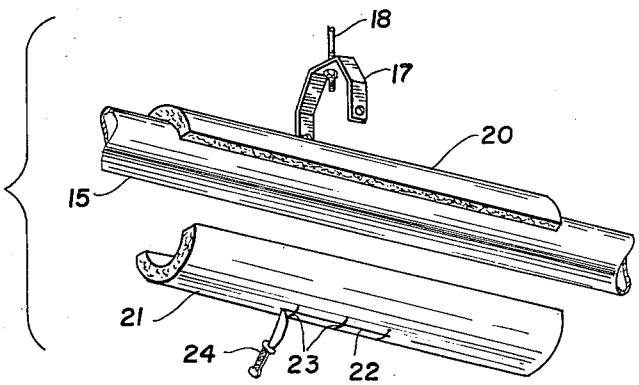
Figure 4:
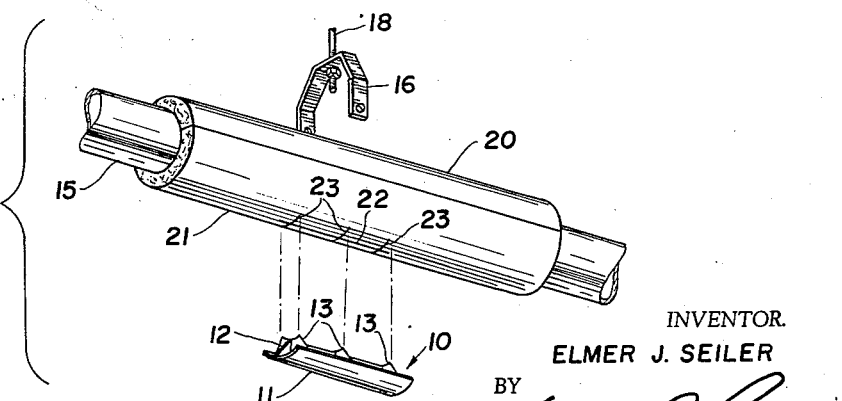

FIG. 3 is an exploded view showing the fluid conducting pipe covered by a cylindrical bat of insulation after the bottom semi-circular half of the insulating bat is separated and initially scored to facilitate insertion therein of the insert shown in FIG. 1; and FIG. 4 is a bottom, perspective view showing the insulating bat in place and showing the insert as it is about to be pushed into the bat so as to pierce the insulation and provide a hard arcuate surface forming a continuation of the arcuate surface of the insulation.

Referring more particularly to FIG. 1, numeral 10 generally denotes a one piece or integral insert made of any dense, hard, material such as plastic or metal, and comprising an arcuate bottom surface in the form of a curved sheet having upstanding integrally therefrom a grid-like or somewhat egg carton shaped partitions 12 and 13 whose top edges may or may not be feathered, as desired.

Figure 2:
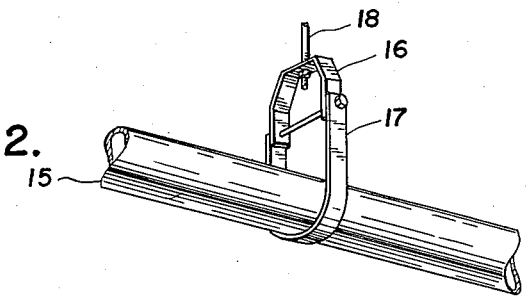
FIG. 2 is a perspective view, at somewhat reduced scale, showing a pipe 15 for conducting hot or cold fluid supported by a hanger.

FIG. 2 shows a metallic pipe 15 for conducting either hot or cold liquid, such as for use in an air conditioning system. The pipe is supported by a hanger comprising an upper inverted U-shaped element 16 and a lower U-shaped element 17, which hanger is adjustably supported in height by a rod 18 onto the lower threaded end of which there is screwed a nut. In most applications however, it is desirable to provide an insulating cover over the pipe 15 to prevent either loss of heat or cold.

As shown in FIG. 3 such cover is generally in the form of an upper semi-cylindrical bat 20 and a lower semi-cylindrical bat 21. To prevent the contacting portion of the hanger element 17 from becoming unduly embedded in and fracturing the insulation, an insert such as 10 in FIG. 1 is pierced into the bottom surface of insulating bat 21. Score lines 22 and 23 may be made by knife 24 to facilitate entry of partitions 12 and 13. Or perhaps the upper edges of such partitions may be sufficiently feathered so that such score lines are not necessary. In any event, the insert 10 is pressed into the bottom surface of insulating bat 21 until partitions 12 and 13 contact pipe 15 and the outer surface of the arcuate sheet 11 is flush with the outer surface of insulating bat 21.

In operation, therefore, when the lower portion of hanger part 17 supports the weight of the pipe, such weight will not crush the insulation, but will be resisted firmly by the hard surfaced insert 10 which acts like an integral part of bat 21.

Thus it will be seen that I have provided an efficient, relatively simple and inexpensive insert that may be easily pushed into and embedded in a hollow cylindrical bat of insulation to provide a rigid support for contacting the hanger so that the weight of the pipe will not cause fracture or undue compression of the insulation to injure its effectiveness.

While I have illustrated and described a single specific embodiment of my invention, it will be understood that this is by way of illustration only, and that various changes and modifications may be made within the contemplation of my invention and within the scope of the following claims.

I claim:

1. In combination with a substantially horizontally extending pipe which carries a fluid and a hollow insulating bat surrounding said pipe, an insert having an outer arcuate surface corresponding to that of the insulating bat and having inwardly projecting portions for piercing the insulation as the insert is pressed against it, and a hanger for directly supporting the pipe and insulation and for directly contacting the outer surface of said insert to prevent abnormal compression.

2. An assembly recited in claim 1 in which said insert is of rigid plastic material.

3. An assembly recited in claim 1 wherein said insert is of metal.

4. An insert for attachment to the outer surface of an arcuate bat of insulation for direct support by a hanger, comprising an arcuate sheet portion corresponding in shape to the arcuate surface of said bat and having integral upstanding partitions of egg-crate construction which are adapted to pierce the insulation throughout its entire thickness and effect a rigid bond between the insert and insulation.

References Cited in the file of this patent
UNITED STATES PATENTS

| 2,611,567 | Williamson | Sept. 23, 1952 |
| 2,714,497 | Denis | Aug. 2, 1955 |

FOREIGN PATENTS

| 990,605 | France | June 6, 1951 |